US011159686B2

(12) United States Patent
Kasahara

(10) Patent No.: US 11,159,686 B2
(45) Date of Patent: Oct. 26, 2021

(54) IMAGE PROCESSING APPARATUS AND METHOD FOR SAME PROVIDING A RANKED BUTTON ARRANGEMENT ACCORDING TO THE STATE OF THE IMAGE PROCESSING APPARATUS

(71) Applicant: CANON KABUSHIKI KAISHA, Tokyo (JP)

(72) Inventor: Kimito Kasahara, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/990,380

(22) Filed: Aug. 11, 2020

(65) Prior Publication Data
US 2021/0058524 A1    Feb. 25, 2021

(30) Foreign Application Priority Data
Aug. 22, 2019  (JP) .............................. JP2019-152247

(51) Int. Cl.
*H04N 1/00* (2006.01)
*G06F 3/0482* (2013.01)
*G06F 3/12* (2006.01)

(52) U.S. Cl.
CPC ....... *H04N 1/00435* (2013.01); *G06F 3/0482* (2013.01); *G06F 3/1222* (2013.01); *G06F 3/1238* (2013.01)

(58) Field of Classification Search
None
See application file for complete search history.

(56) References Cited

U.S. PATENT DOCUMENTS

2013/0290885 A1* 10/2013 Kobayashi ......... H04N 1/00411
715/765
2014/0368875 A1* 12/2014 Sato ................... H04N 1/00474
358/1.15
2016/0170600 A1*  6/2016 Horiike ................. G06F 3/0486
715/769

FOREIGN PATENT DOCUMENTS

JP       2011-210009 A    10/2011

* cited by examiner

*Primary Examiner* — Thomas D Lee
(74) *Attorney, Agent, or Firm* — Canon U.S.A., Inc. I.P. Division

(57) ABSTRACT

An image processing apparatus provides a user with a menu screen having a button arrangement that is easy for the user to find a desired button. Accordingly, a rank of a button for executing processing related to a state of the image processing apparatus is changed to be high in an arrangement order of buttons.

19 Claims, 10 Drawing Sheets

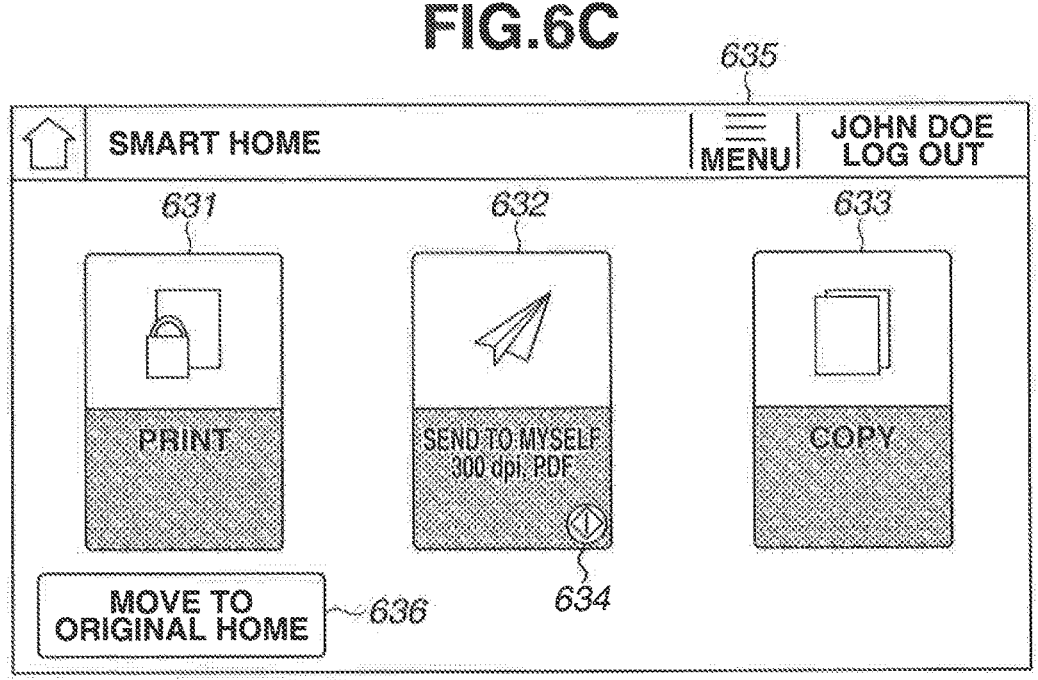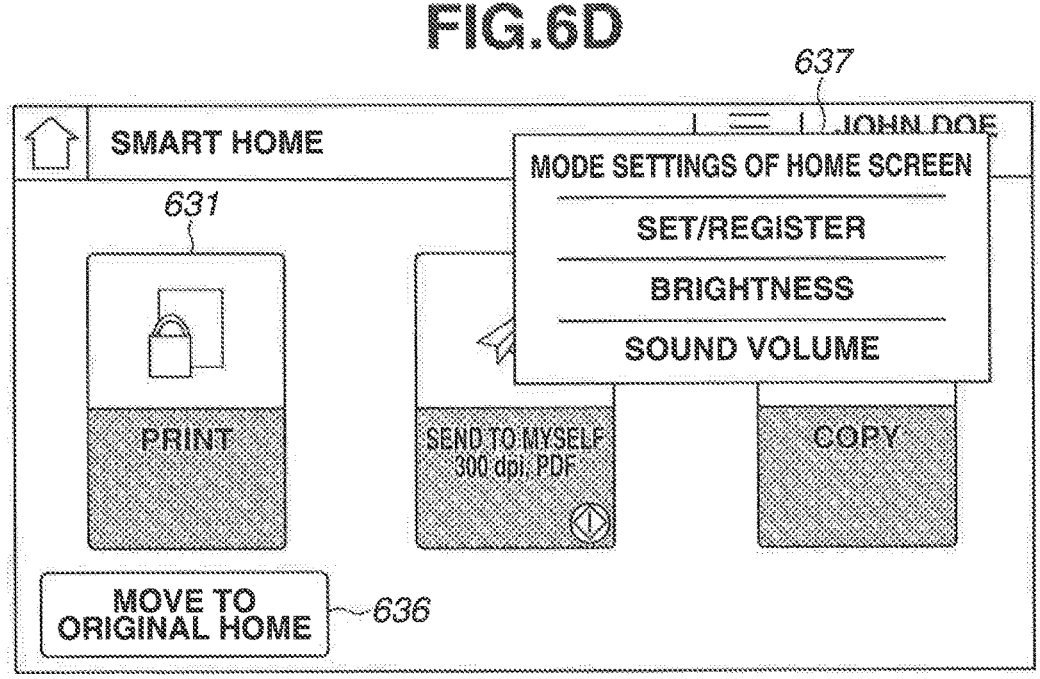

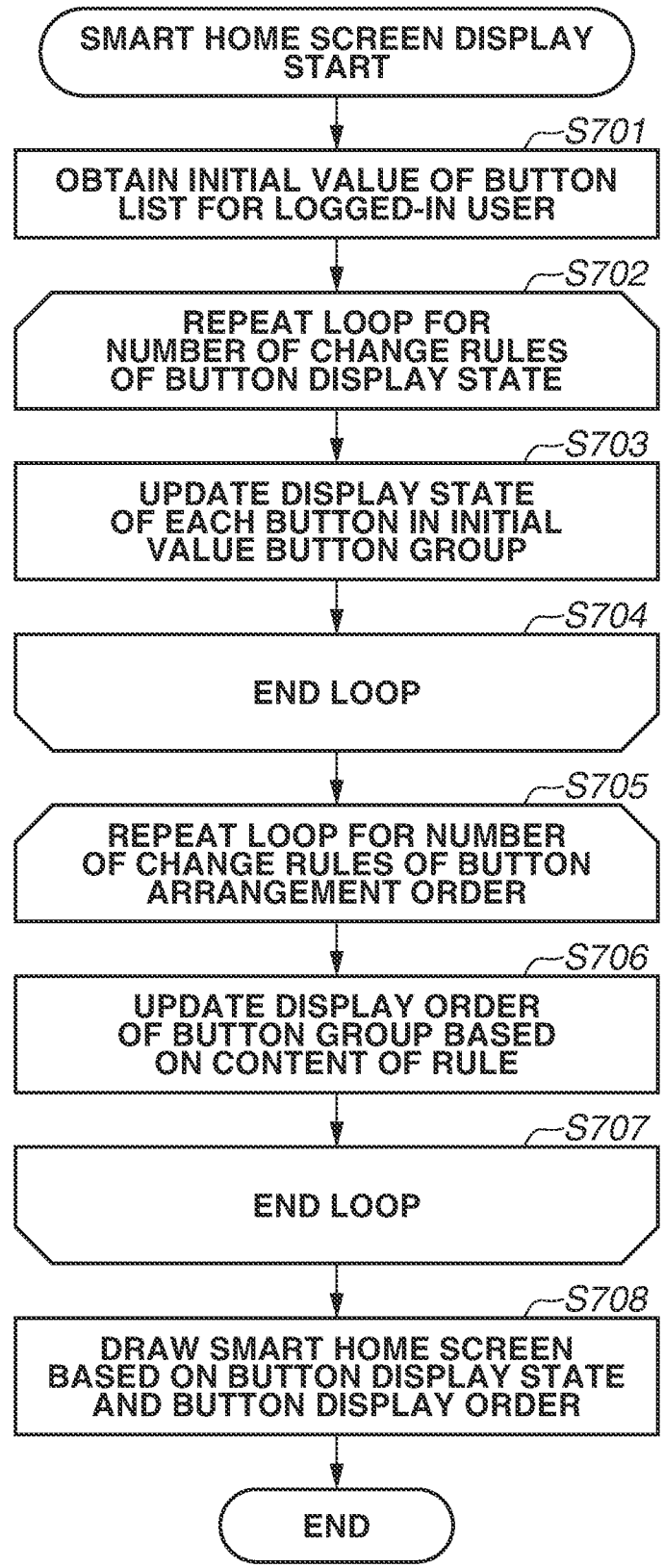

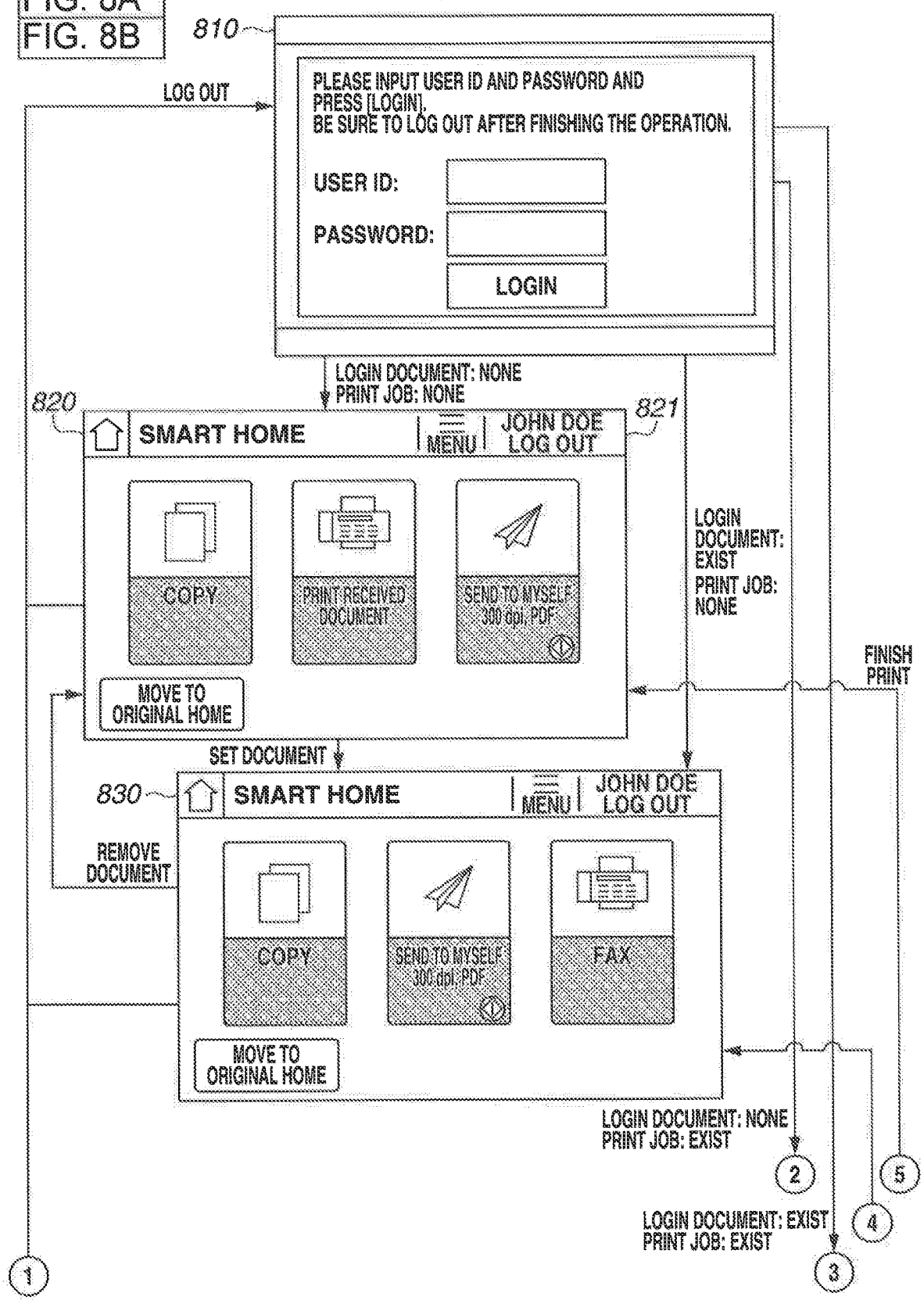

IMAGE PROCESSING APPARATUS AND METHOD FOR SAME PROVIDING A RANKED BUTTON ARRANGEMENT ACCORDING TO THE STATE OF THE IMAGE PROCESSING APPARATUS

BACKGROUND

Field of the Disclosure

The present disclosure relates to an image processing apparatus including an operation unit, a method for controlling the image processing apparatus, and a storage medium.

Description of the Related Art

An image processing apparatus can display, on an operation unit, a menu screen for presenting a button for executing a function such as copying and scanning of the image processing apparatus to a user after the user logs into the image processing apparatus. The user can instruct the image processing apparatus to set and execute the function by pressing the above-described button on the menu screen. For example, Japanese Patent Application Laid-Open No. 2011-210009 discusses a technique for displaying, on a home screen, many buttons such as a button for selecting a copy mode, a button for comprehensively selecting send-type modes, and a button for individually selecting a send-type mode such as an e-mail or a facsimile (FAX) when a user logs into an image processing apparatus.

However, it may be difficult for a user to find a desired button if many buttons are arranged on the home screen as in a conventional technique.

SUMMARY

According to the present disclosure, there is provided an image processing apparatus including a menu screen, that is characterized by comprising: a memory; and a processor in communication with the memory, wherein the processor performs: displaying a plurality of buttons for receiving execution of processing on the menu screen; detecting a state of the image processing apparatus; changing, using one of states as a target, a rank of a button for executing processing related to the one of the states as the target to be high in an arrangement order of buttons on the menu screen; and, in a case where one state is detected in the detecting, controlling to execute the changing corresponding to the detected one state and, in a case where a plurality of states is detected in the detecting, controlling to repeatedly execute the changing using each of the detected plurality of states as the target one by one in sequence based on a condition.

Further features of the present disclosure will become apparent from the following description of exemplary embodiments with reference to the attached drawings.

BRIEF DESCRIPTION OF THE DRAWINGS

FIGS. 6A, 6B, 6C and 6D are schematic diagrams illustrating examples of the initial screen.

FIG. 7 is a flowchart illustrating an example of processing for displaying a smart home screen.

DESCRIPTION OF THE EMBODIMENTS

Exemplary embodiments of the present disclosure will be described in detail below with reference to the attached drawings. The exemplary embodiments are described using an image processing apparatus as an example of an information processing apparatus, but the following exemplary embodiments are not intended to limit the present disclosure set forth in the claims. Not all combinations of features described in the exemplary embodiments are necessarily indispensable to the solving means of to the present disclosure.

First Exemplary Embodiment

Figure 1:
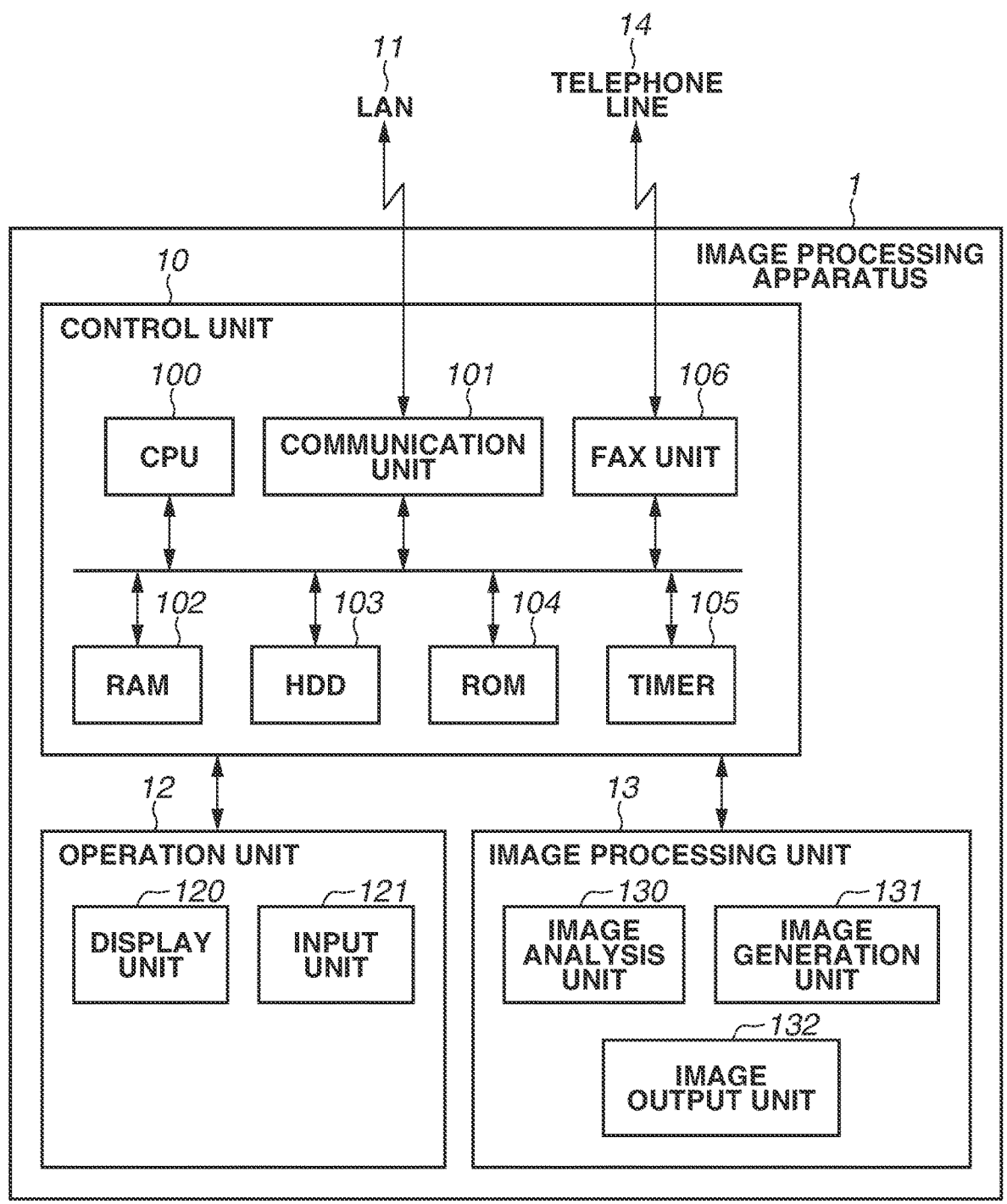
FIG. 1 is a block diagram illustrating a configuration of an image processing apparatus according to an exemplary embodiment of the present disclosure.

FIG. 1 is a block diagram illustrating a configuration of an image processing apparatus 1 according to a first exemplary embodiment. The image processing apparatus 1 includes a control unit 10, an operation unit 12, and an image processing unit 13.

The control unit 10 controls an operation of each unit in the image processing apparatus 1, The control unit 10 includes a central processing unit (CPU) 100, a local area network (LAN) 11, a communication unit 101, a random access memory (RAM) 102, a hard disk drive (HDD) 103, a read-only memory (ROM) 104, a timer 105, and a facsimile (FAX) unit 106, The CPU 100 entirely controls the control unit 10. The LAN 11 is a network for exchanging data with an external device, and the image processing apparatus 1 is connected to the Internet via the LAN 11. The communication unit 101 performs data transmission and reception via the LAN 11. The RAM 102 provides a system work memory for the CPU 100 to operate. The HDD 103 may be a storage medium such as a magnetic disk, an optical medium, and a flash memory. The HDD 103 can store document data, setting data, and the like. The HDD 103 may not be included in the image processing apparatus 1. An external server or a personal computer (PC) may be used as a data storage device via the communication unit 101. The ROM 104 is a boot ROM and stores a boot program of a system. The CPU 100 loads a program installed in the HDD 103 into the RAM 102 by using the boot ROM in the ROM 104 and performs various types of control based on the program. The timer 105 measures time based on an instruction from the CPU 100 and notifies the CPU 100 of a lapse of a specified period of time by interruption. The FAX unit 106 performs transmission and reception of FAX data via a telephone line 14.

The operation unit 12 is controlled by the control unit 10 and includes a display unit 120 and an input unit 121. The display unit 120 is a display for displaying information about the image processing apparatus 1 to a user. The input unit 121 receives an operation input from a user via an interface such as a touch panel, a mouse, a camera, a voice input device, and a keyboard.

The image processing unit 13 is controlled by the control unit 10 and includes an image analysis unit 130, an image generation unit 131, and an image output unit 132. The image analysis unit 130 analyzes a structure of a document image and extracts necessary information from an analysis result. The image generation unit 131 reads a document (for example, by scanning), generates image data thereof by digitalizing an image of the document, and stores the image data in the HDD 103. The image generation unit 131 can also generate image data of the document in another format by using the information analyzed by the image analysis unit 130. The image output unit 132 outputs the image data stored in the HDD 103. An output method by the image output unit 132 may be, for example, printing the image data of the document on a sheet, transmitting the image data of the document to an external device, a server, or a facsimile apparatus connected to the network via the communication unit 101, or storing the image data of the document in a storage medium connected to the image processing apparatus 1.

Figure 2:
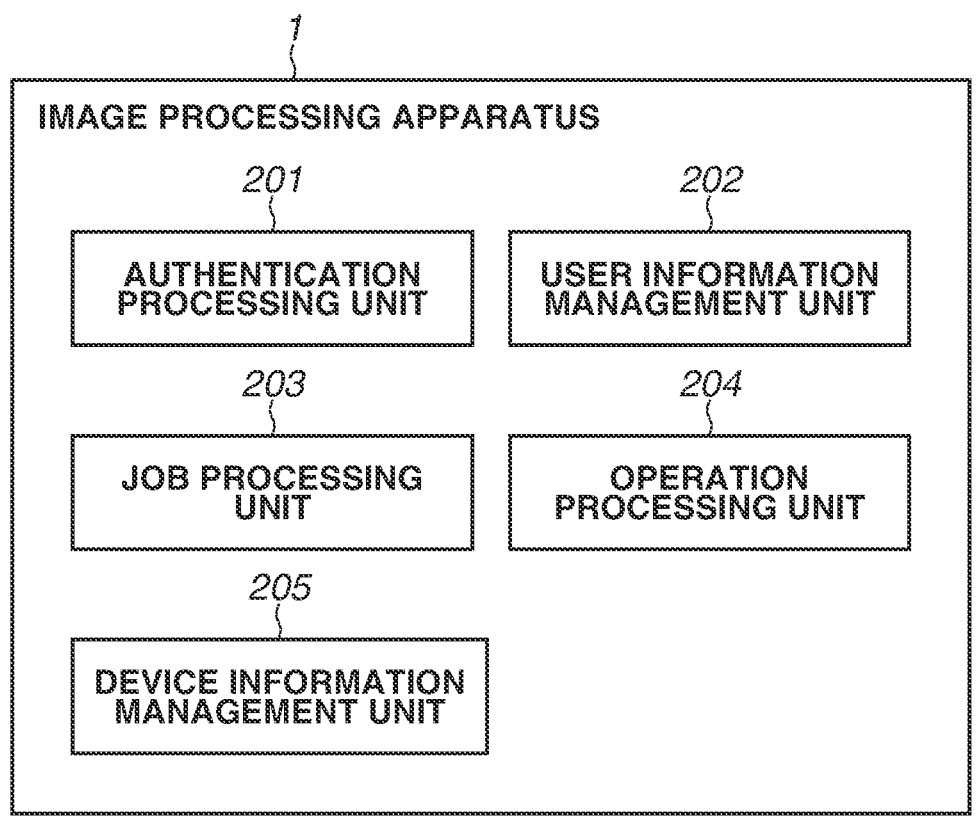
FIG. 2 is a block diagram illustrating an example of a function of the image processing apparatus.

FIG. 2 is a block diagram illustrating an example of a function of the image processing apparatus 1 in FIG. 1. The image processing apparatus 1 includes an authentication processing unit 201, a user information management unit 202, a job processing unit 203, an operation processing unit 204, and a device information management unit 205 as functions thereof. Each of the function units is a function to be implemented by the CPU 100 loading a program, which is installed in the HDD 103, into the RAM 102 by using the boot ROM in the ROM 104 and executing the program.

The authentication processing unit 201 performs processing of receiving a login/logout request from a user, authenticating the user, and identifying the user who uses the image processing apparatus 1.

The user information management unit 202 manages information about the user identified by the authentication processing unit 201. For example, the user information management unit 202 manages a use language to be used (e.g., English, Japanese) for each user and can switch the use language to be used depending on a logged-in user. Further, the user information management unit 202 can manage a print job received from the external device via the communication unit 101 for each user who inputs the print job.

The job processing unit 203 performs processing of various jobs to be executed by the image processing apparatus 1. Specifically, the job processing unit 203 controls the image generation unit 131, the image output unit 132, and the communication unit 101 to execute a scan job, to execute a print job, and to transmit a job, respectively.

The operation processing unit 204 controls the display unit 120 to display various types of information to the user. Further, the operation processing unit 204 receives an operation instruction input from the input unit 121 by the user and performs processing.

The device information management unit 205 manages information about the entire image processing apparatus 1. A specific example of the information is an Internet Protocol (IP) address assigned to the image processing apparatus 1 and a setting value common to all users who use the image processing apparatus 1. The device information management unit 205 can manage information similar to the information managed by the user information management unit 202. For example, in a case where English is set as a common setting of the use language in the device information management unit 205, an English message is presented to a user if the user who has not set the use language uses the image processing apparatus 1. However, in a case where a user who has set Japanese as the use language uses the image processing apparatus 1, a Japanese message can be presented to this user.

Figure 3:
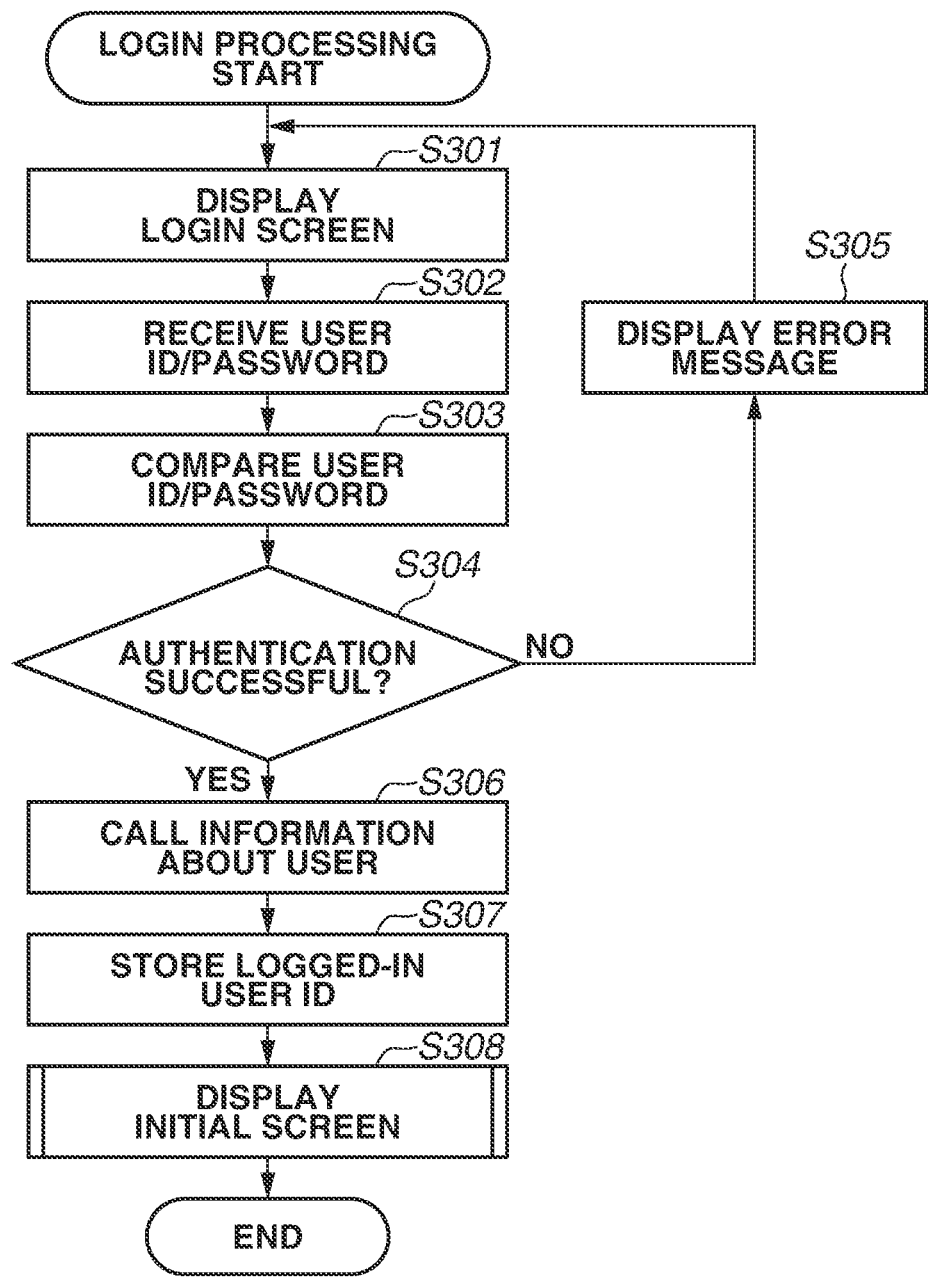
FIG. 3 is a flowchart illustrating an example of processing from startup to displaying a screen for a logged-in user.

Next, processing from startup of the image processing apparatus 1 to displaying a screen for a logged-in user is described with reference to a flowchart in FIG. 3. The processing in the flowchart in FIG. 3 is implemented by the authentication processing unit 201, the user information management unit 202, the job processing unit 203, the operation processing unit 204, and the device information management unit 205.

Figure 4:
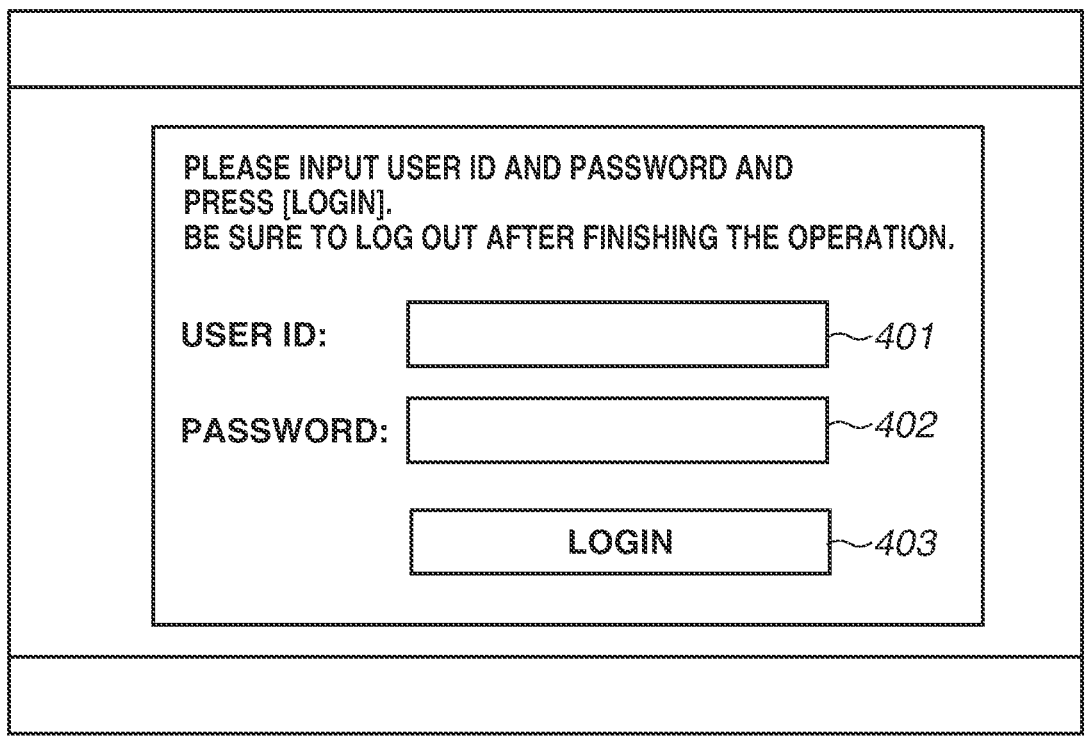
FIG. 4 is a schematic diagram illustrating an example of a login screen.

In step S301, the authentication processing unit 201 displays a login screen on the display unit 120. The authentication processing unit 201 determines whether there is a login request. The login request is made in such a manner that a login screen (FIG. 4) is displayed on the display unit 120, and a user inputs an identification (ID) and a password via the input unit 121. FIG. 4 illustrates an example of the login screen displayed on the display unit 120. A user inputs a login user ID and a password in a user ID input column 401 and a password input column 402, respectively, and makes a login request by pressing a login key 403.

In step S302, the authentication processing unit 201 receives the user ID and the password. The login request may be made by an input from an integrated circuit (IC) card reading device or a biometric authentication device using fingerprint authentication that is connected to the input unit 121 in the image processing apparatus 1. In step S303, upon receiving the login request, the authentication processing unit 201 compares whether a user ID and a password stored in the HDD 103 matches the input user ID and password. In step S304, if the authentication processing unit 201 determines that the input user ID and password do not match the stored ones (NO in step S304), in step S305, an error message is displayed for a predetermined period of time on the display unit 120 via the operation processing unit 204. Subsequently, in step S301, the authentication processing unit 201 displays the login screen on the display unit 120 via the operation processing unit 204.

In step S304, if the authentication processing unit 201 determines that the input user ID and password match the stored ones (YES in step S304), in step S306, the user information management unit 202 calls information associated with the user stored in the HDD 103.

Next, in step S307, the user ID of the user who succeeds in authentication in step S304 is stored in the HDD 103 as a user who is currently logged in.

Subsequently, in step S308, the operation processing unit 204 displays an initial screen on which the called information about the logged-in user is reflected on the display unit 120, The initial screen according to the present exemplary embodiment is a screen that is displayed to the user immediately after the user logs in to the image processing apparatus 1. Example of the initial screen includes a screen of various applications including a copy application that enables setting and execution of a copy job and a menu screen (hereinafter, referred to as a home screen) on which buttons for executing various applications are arranged. A user or an administrator of the image processing apparatus 1 can set in advance which initial screen is displayed.

Figure 5:
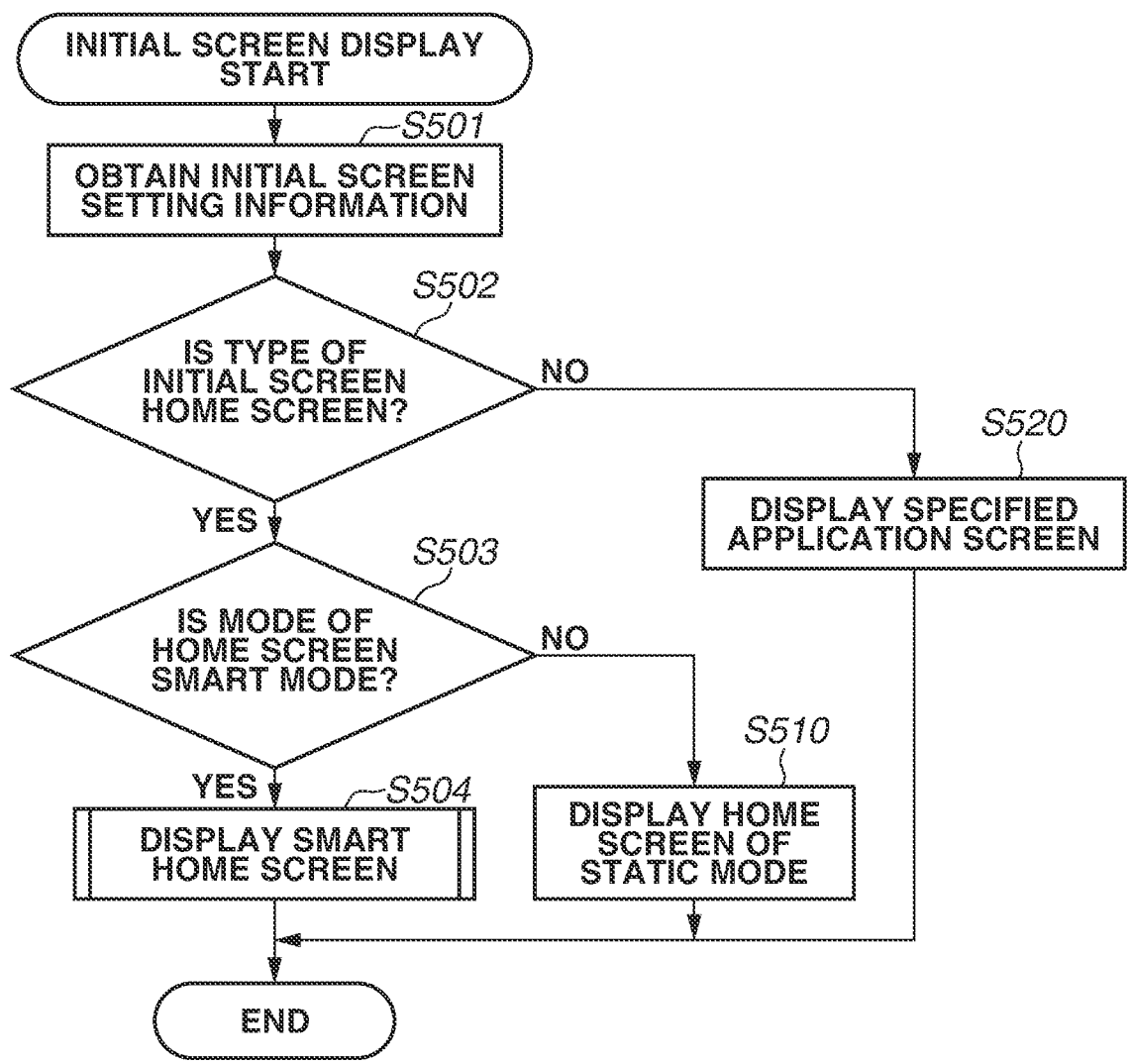
FIG. 5 is a flowchart illustrating an example of processing for displaying an initial screen.

Next, the processing for displaying the initial screen in step S308 is described in detail with reference to a flowchart in FIG. 5. The processing in the flowchart in FIG. 5 is implemented by the authentication processing unit 201, the user information management unit 202, the job processing unit 203, the operation processing unit 204, and the device information management unit 205.

In step S501, the operation processing unit 204 obtains setting information about the initial screen to be presented to the logged-in user from the user information management unit 202 and the device information management unit 205. Specifically, if the setting information about the initial screen specific to the logged-in user is set in advance in the user information management unit 202, the setting information is used. Otherwise, the setting information about the initial screen stored as default information in the device information management unit 205 is used.

Figure 6A:
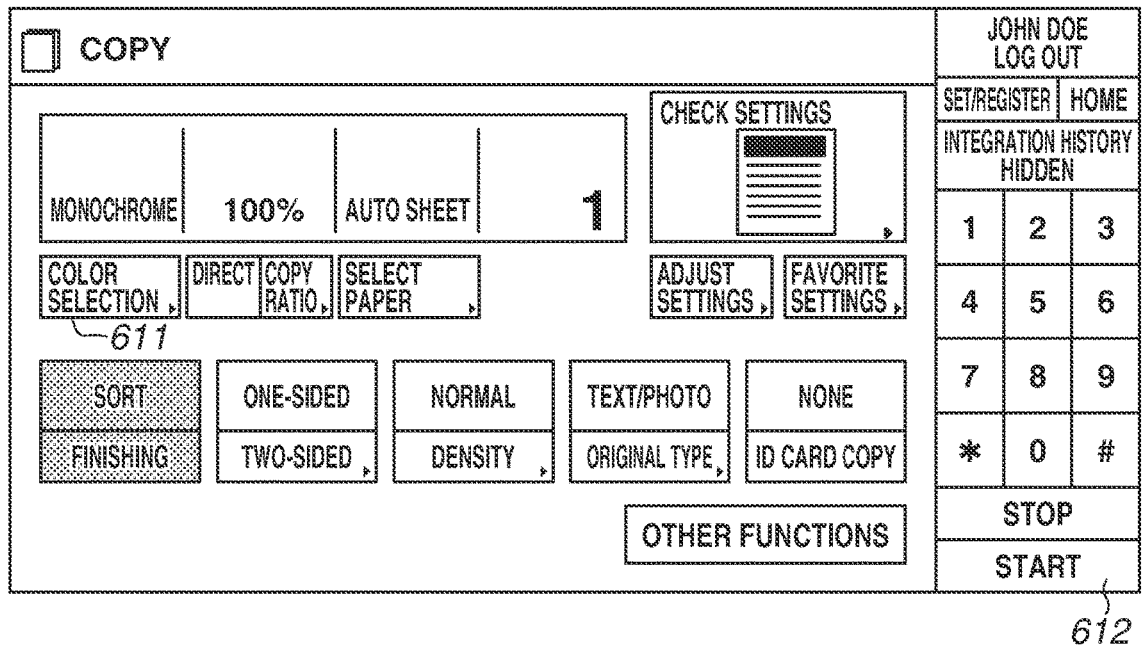

Next, in step S502, the operation processing unit 204 determines a type of the initial screen based on the setting information about the initial screen obtained in step S501. If the type of the initial screen determined in step S502 is a screen of various applications such as a copy application (FIG. 6A) (NO in step S502), in step S520, the operation processing unit 204 displays the screen of the application specified as the initial screen on the display unit 120 as the initial screen, and terminates the processing. FIG. 6A illustrates an example of a copy application screen as an example of the screen of various applications. The copy application receives an instruction to display and change a setting content for copying from a user via a color selection button 611 and the like. Further, a start button 612, which receives an instruction to start copying using the setting content displayed on the screen, is arranged on the screen. If pressing of the start button 612 is detected, the operation processing unit 204 instructs the job processing unit 203 to execute a job corresponding to the setting content.

If the type of the initial screen determined in step S502 is the home screen (YES in step S502), in step S503, the operation processing unit 204 determines a mode of the home screen based on the setting information about the initial screen.

Figure 6B:
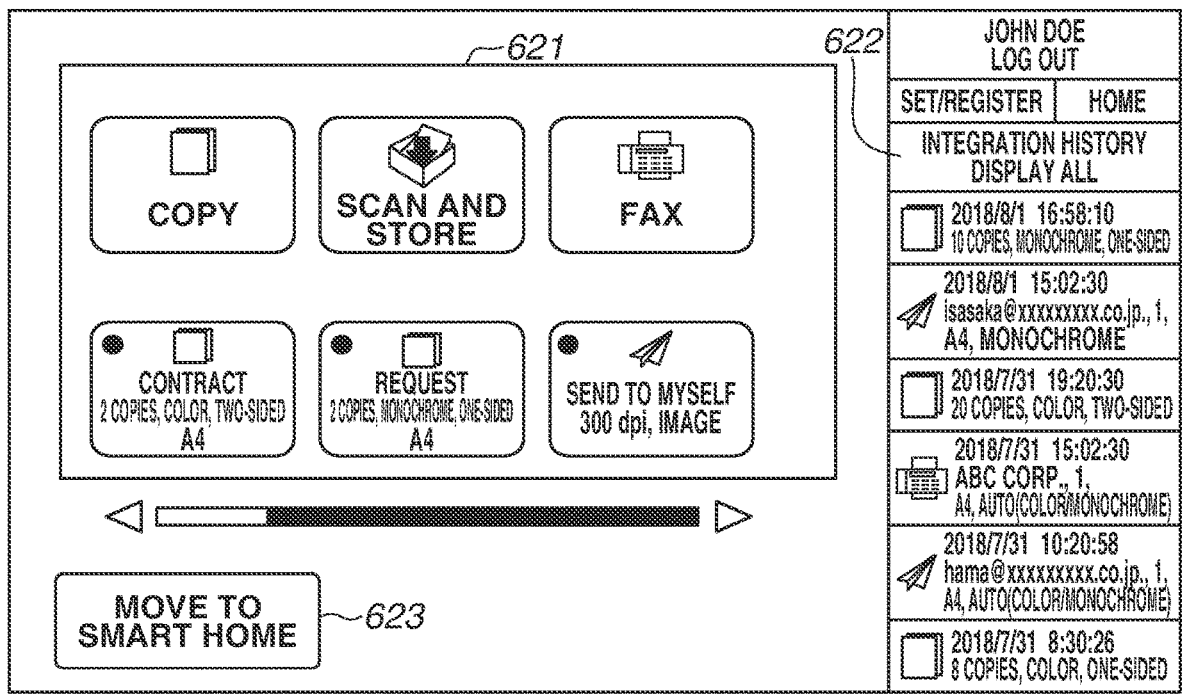

In step S503, if the mode of the home screen is a static mode (NO in step S503), in step S510, the operation processing unit 204 displays a home screen of the static mode (FIG. 6B) on the display unit 120, and terminates the processing. FIG. 6B illustrates an example of the home screen of the static mode. On the home screen of the static mode, there are arranged a button area 621 in which an application available to a user is displayed as a button, and a history display area 622 in which a history of a job setting executed so far b the user is displayed. Further, a smart mode switching button 623 used to switch to a home screen of a smart mode (hereinafter, referred to as a smart home screen) described below is also arranged on the home screen of the static mode.

The smart home screen is a menu screen for implementing the present exemplary embodiment. Unlike on the home screen of the static mode, a button to be displayed on the smart home screen is dynamically changed depending on a state of the image processing apparatus 1. The state of the image processing apparatus 1 includes a reception state of a print job and a FAX job, presence of a document on a document platen or an automatic document feeder (ADF) of a scanner, and availability of various functions of the image processing apparatus 1. The number of buttons displayed on the smart home screen is three, which is smaller than that on the home screen of the static mode.

In step S503, if the mode of the home screen is the smart mode (YES in step S503), in step S504, the operation processing unit 204 displays the smart home screen (FIG. 6C) on the display unit 120, and terminates the processing. FIG. 6C illustrates an example of the smart home screen. A button to be displayed on the smart home screen is referred to as a smart button, and smart buttons 631 to 633 are displayed. As the smart button, a button (smart button 632) for starting job execution using a predetermined setting upon being pressed may be arranged in addition to an application button (smart buttons 631 and 633) for transitioning to the application screen such as the copy application screen. Hereinafter, the smart button 632 is referred to as an immediate execution button 632. For example, the immediate execution button 632 enables an operation of scanning a document and transmitting an image generated by the scanning to a transmission destination such as an e-mail address associated with the logged-in user in advance to be performed in a single action. In the present exemplary embodiment, the immediate execution button 632 is distinguished from other application buttons in appearance by an immediate execution icon 634 indicating that a job is to be immediately executed. Further, a menu button 635 is arranged on the smart home screen, and, if the menu button 635 is pressed, a menu screen (FIG. 6D) on which various settings can be displayed and changed can be displayed. On the menu screen, various menus are displayed including a mode setting menu 637 for setting the mode of the home screen to be referred to in step S503. In addition, a static mode switching button 636 for transitioning to the home screen of the static mode exemplified in FIG. 6B is arranged on the smart home screen.

Both of the home screen of the static mode in FIG. 6B and the smart home screen in FIG. 6C are screens for calling the application screen and for executing a job using the predetermined setting. However, these two modes are different in the functionality they have.

As the home screen of the static mode, basically the same screen is provided to all users, and a user can customize an arrangement order of buttons by himself/herself. In other words, the user uses the same screen as another user unless the user customizes the home screen by himself/herself.

In contrast, on the smart home screen, a content and an arrangement order of smart buttons presented to the user are changed depending on the state of the image processing apparatus 1. Thus, unlike the home screen of the static mode, the smart home screen has a feature that a user does not have to actively customize the screen.

Next, the processing for displaying the smart home screen in step S504 is described in detail with reference to a flowchart in FIG. 7. The processing in the flowchart in FIG. 7 is implemented by the authentication processing unit 201, the user information management unit 202, the job processing unit 203, the operation processing unit 204, and the device information management unit 205.

In the present exemplary embodiment, an example is described in which a button display state and a button arrangement order are determined in a case where the state of the image processing apparatus 1 at the time of login by a user is "the FAX unit 106 is not available", "a document is placed on a scanner unit", and "a print job associated with the logged-in user is accumulated".

In step S701, the operation processing unit 204 obtains an initial value of a button list corresponding to the logged-in user from the device information management unit 205 and the user information management unit 202. The button list is a list of information about buttons to be displayed on the home screen as indicated in Table 1. In obtaining the button list, all pieces of information may be obtained from either the device information management unit 205 or the user information management unit 202, or may be obtained by referring to contents in both of the device information management unit 205 and the user information management unit 202. Table 1 illustrates an example of the button list after completion of the processing in step S701.

TABLE 1

Button List After Completion of Processing in Step S701

| Identifier (C101) | Button Name (C102) | Displayable (C103) | Immediate Execution (C104) | Image Output Related (C105) | Image Generation Related (C106) | FAX Reception Related (C107) | Use Application (C108) |
|---|---|---|---|---|---|---|---|
| 001 | Copy | Yes | No | Yes | Yes | No | Copy |
| 002 | Print Received Document | Yes | Yes | Yes | No | Yes | Confidential Box |
| 003 | Send to Myself | Yes | Yes | No | Yes | No | Scan and Send |
| 004 | FAX | Yes | No | No | Yes | No | FAX |
| 005 | Scan and Send | Yes | No | No | Yes | No | Scan and Send |
| 006 | Print | Yes | No | Yes | No | No | Print |

Each row corresponds to an individual smart button, and each column indicates information about each button. An identifier column C101 is a numerical value uniquely assigned to a button. A button name column C102 is a name of the button displayed on the smart home screen. Displayable column C103 indicates whether the button is available for use by the logged-in user in the current state. In other words, the button finally marked with "No" in the displayable column C103 after the processing in the present flowchart is executed is not displayed on the home screen Immediate execution column C104 indicates whether the button is a button for causing immediate execution of a job by being pressed. In a case where the button marked with "Yes" is pressed, processing is immediately executed. An image output related column C105 indicates whether the button is related to an image output function. For example, the button with the button name "Copy" is used to output read data on paper, and thus, the column of the image output related column C105 is marked with "Yes". An image generation related column C106 indicates whether the button is related to an image generation function. For example, the button with the button name "Scan and Send" is used to read a document with the scanner and to generate document image data, and thus, the column of the image generation related column C106 is marked with "Yes". A FAX reception related column C107 indicates whether the button is related to a FAX reception function. A use application column C108 indicates a name of the application that actually operates when the button is pressed. Further, in the present exemplary embodiment, the button list is managed as an ordered list, and the button on the top of the button list is regarded as a highest-ranked button in an arrangement order. In other words, in the button list illustrated in Table 1, the button with an identifier 001 has a highest display priority, and the button is displayed in a leftmost part of the home screen. Since only three buttons are displayed on the smart home screen, the buttons with identifiers 001 to 003 are arranged in order from the left. The buttons with identifiers 004 to 006 are arranged in the order indicated in the button list from the left on a second page of the home screen. An element to be included in the button list is not limited to the above-described one, and another element may be included therein. In the flowchart described below, the operation processing unit 204 performs processing for changing the arrangement order on the button list and displays the smart home screen.

Next, in steps S702 to S704, the operation processing unit 204 applies a change rule of the button display state to the button list after completion of the processing in step S701. The change rule of the button display state is a software module that changes a content of the displayable column C103 of each button in the button list based on a predetermined rule using the button list as an input. In the present exemplary embodiment, the change rule of the button display state is included in the operation processing unit 204 in advance, but may be managed in another mode such as being supplied from the outside of the image processing apparatus 1. As an example of the change rule of the button display state, it is conceivable that the state of the image processing apparatus 1 is reflected in the displayable column C103. Specifically, if the FAX unit 106 is not available for some reason, it is conceivable that the button of which the use application column C108 is "FAX" is marked with "No" in the displayable column C103. Similarly, in a case where the button display state is intended to be changed using an event other than FAX as a trigger, it can be implemented by setting the change rule of the display state of each button and modularizing the change rule as software. Table 2 illustrates an example of the button list obtained by applying the above-described change rule of the button display state regarding FAX to the button list in Table 1 (after completion of the processing in step S704). The displayable column C103 is changed to "No" in the button of which the identifier column C101 is "004".

TABLE 2

Button List After Completion of Processing in Step S704

| Identifier (C101) | Button Name (C102) | Displayable (C103) | Immediate Execution (C104) | Image Output Related (C105) | Image Generation Related (C106) | FAX Reception Related (C107) | Use Application (C108) |
|---|---|---|---|---|---|---|---|
| 001 | Copy | Yes | No | Yes | Yes | No | Copy |
| 002 | Print Received Document | Yes | Yes | Yes | No | Yes | Confidential Box |

TABLE 2-continued

Button List After Completion of Processing in Step S704

| Identifier (C101) | Button Name (C102) | Displayable (C103) | Immediate Execution (C104) | Image Output Related (C105) | Image Generation Related (C106) | FAX Reception Related (C107) | Use Application (C108) |
|---|---|---|---|---|---|---|---|
| 003 | Send to Myself | Yes | Yes | No | Yes | No | Scan and Send |
| 004 | FAX | No | No | No | Yes | No | FAX |
| 005 | Scan and Send | Yes | No | No | Yes | No | Scan and Send |
| 006 | Print | Yes | No | Yes | No | No | Print |

Next, in steps S705 to S707, the operation processing unit 204 repeatedly applies a change rule of the button arrangement order to the button list after completion of the processing in step S704. The change rule of the button arrangement order is a software module that changes an order of buttons in the button list using the button list as an input. In the present exemplary embodiment, the change rule of the button arrangement order is included in the operation processing unit 204 in advance, but may be managed in another mode such as being supplied from the outside of the image processing apparatus 1. In the present exemplary embodiment, the state of the image processing apparatus 1 is "a document is placed on the scanner unit" and "a print job associated with the logged-in user is accumulated", and an example of the change rule of the button arrangement order is described with respect to these two events.

The first one is the change rule of the button arrangement order for changing the order in the button list based on a physical state change in the image processing apparatus 1. Specifically, a document is placed on the scanner unit (document reading unit) in the image processing apparatus 1, and the image generation unit 131 is brought into a state ready for generating a document image of the document read with the scanner unit. This state serves as a trigger, and the order in the button list is changed so that the button that is marked with "Yes" in the image generation related column C106 is placed at a higher rank in the button list. Table 3 illustrates the button list obtained by applying the above-described change rule of the button arrangement order to the button list in Table 2. The buttons "Copy", "Send to Myself", "FAX", and "Scan and Send", which are marked with "Yes" in the image generation related column C106, are placed at the higher ranks in the arrangement order, and accordingly, the arrangement order of the buttons that are marked with "No" in the image generation related column C106 is lowered.

TABLE 3

Button List After Executing Processing for Prioritizing Image Generation Related Button

| Identifier (C101) | Button Name (C102) | Displayable (C103) | Immediate Execution (C104) | Image Output Related (C105) | Image Generation Related (C106) | FAX Reception Related (C107) | Use Application (C108) |
|---|---|---|---|---|---|---|---|
| 001 | Copy | Yes | No | Yes | Yes | No | Copy |
| 003 | Send to Myself | Yes | Yes | No | Yes | No | Scan and Send |
| 004 | FAX | No | No | No | Yes | No | FAX |
| 005 | Scan and Send | Yes | No | No | Yes | No | Scan and Send |
| 002 | Print Received Document | Yes | Yes | Yes | No | Yes | Confidential Box |
| 006 | Print | Yes | No | Yes | No | No | Print |

The second one is the change rule of the button arrangement order for changing the order in the button list based on a print job accumulated in the image processing apparatus 1. Specifically, a user transmits a job such as a print job from an external device to the image processing apparatus 1 in advance, and the image processing apparatus 1 accumulates the transmitted job. This state serves as a trigger, and the order in the button list is changed so that the button that uses an application that can execute the accumulated job (in the present exemplary embodiment, the use application column C108 is "Print") is placed at the higher rank in the button list. In other words, the button list is changed so that the button of which the use application column C108 is "Print" is placed higher in the order of the button list. The user who logs in to the image processing apparatus 1 and the user who transmits the job from the external device are associated with each other in the user information management unit 202, so that the user who has logged in to the image processing apparatus 1 can execute only the job associated with the user. Table 4 illustrates the button list obtained by applying the above-described change rule of the button arrangement order to the button list in Table 3. The button list is changed so that the button of which the use application column C108 is "Print" is placed higher in the arrangement order.

TABLE 4

Button List After Executing Processing for Prioritizing
Button For Printing Print Job Registered by User

| Identifier (C101) | Button Name (C102) | Displayable (C103) | Immediate Execution (C104) | Image Output Related (C105) | Image Generation Related (C106) | FAX Receptior Related (C107) | Use Application (C108) |
|---|---|---|---|---|---|---|---|
| 006 | Print | Yes | No | Yes | No | No | Print |
| 001 | Copy | Yes | No | Yes | Yes | No | Copy |
| 003 | Send to Myself | Yes | Yes | No | Yes | No | Scan and Send |
| 004 | FAX | No | No | No | Yes | No | FAX |
| 005 | Scan and Send | Yes | No | No | Yes | No | Scan and Send |
| 002 | Print Received Document | Yes | Yes | Yes | No | Yes | Confidential Box |

In a case where the state of the image processing apparatus 1 at the time of login is "the FAX unit 106 is not available" "a document is placed on the scanner unit", and "a print job associated with the logged-in user is accumulated", the button list in Table 4 is finally obtained. As described above, the image processing apparatus 1 stores the state of the image processing apparatus 1 in association with functions and attributes of the buttons.

Next, in step S708, the operation processing unit 204 draws the smart home screen based on the content of the determined button list. In the present exemplary embodiment, three buttons are arranged on one screen of the home screen as illustrated in FIG. 6C, so that the top three buttons in the button list in Table 4, namely the buttons with the button names "Print", "Copy", and "Send to Myself", are displayed on the display unit 120 in order from the left. At that time, the button with the name "Send to Myself", which is marked with "Yes" in the immediate execution column C104, is provided with the immediate execution icon 634.

As described above, there is provided the home screen that changes a content to display depending on the state of the image processing apparatus 1 and an operation performed by the user on the image processing apparatus 1. Thus, in a case where the user places a document on the scanner unit, change processing is performed to move the button regarding image generation to the higher rank in the arrangement order. In a case where the print job is accumulated in the image processing apparatus 1, change processing is performed to move the button for executing the print job to the higher rank in the arrangement order. As described above, it is possible to improve operability of a user in using the image processing apparatus 1 by making it easier to select the button that is highly likely to be used by the user.

With respect to the arrangement order of buttons according to the present exemplary embodiment, the change rule of the button arrangement order regarding the event of "a document is placed on the scanner unit" is applied, and then, the change rule of the button arrangement order regarding the event of "a print job associated with the logged-in user is accumulated" is applied. The change rules of the button arrangement order are applied in this order, so that the buttons with the names "Print", "Copy", and "Send to Myself" are displayed on the home screen. The "Copy" and "Send to Myself" buttons that are expected to be used by the user in a case where "a document is placed on the scanner unit", and the "Print" button that is expected to be used by the user in a case where "a print job associated with the logged-in user is accumulated" are displayed. Thus, the buttons are arranged in the order that reflects a user's intention. The order of applying the rules is not limited to the above-described one. A rule to be applied later may be determined in advance (for example, at a time of factory shipment), or the order of applying the rules may be changeable so that the user can set the order of applying the rules. In addition, in a case where a plurality of rules is applied, the button to which the rules are applied the large number of times may be placed at the higher rank in the arrangement order. Further, in a case where the arrangement order of the buttons is intended to be changed using an event other than the above-described one as a trigger, the change rule of the button arrangement order is similarly set and modularized as software, and thus the change in the arrangement order of the buttons can be achieved. In addition, the order of applying the change rule of the button arrangement order is appropriately managed, and thus a button arrangement that reflects a user's intention can be implemented even in a case where there are many events that affect the arrangement order. In the present exemplary embodiment, the example is described in which buttons are rearranged in a case where a plurality of events that change the arrangement order of the buttons is detected. However, in a case where only one event that changes the arrangement order of the buttons is detected, the buttons are similarly rearranged by applying the one rule for changing the button arrangement order corresponding to the event.

Second Exemplary Embodiment

In the first exemplary embodiment, the configuration is described in which the content of the smart home screen to be displayed is changed depending on the state of the image processing apparatus 1 at a time of receiving a login of the user. In a second exemplary embodiment, a configuration is described in which a home screen is updated in a case where a state of the image processing apparatus 1 is changed by an operation performed by a user on the image processing apparatus 1 after the user logs in to the image processing apparatus 1 and a smart home screen is displayed. A basic configuration according to the present exemplary embodiment is similar to that according to the first exemplary embodiment, so that only a difference is described.

In the present exemplary embodiment, an example is described in which an arrangement order of buttons is changed because of a user placing a document on the scanner unit or executing an accumulated print job after the home screen is displayed in step S708 in the flowchart in FIG. 7. If an event that causes a change in the arrangement order of buttons occurs after the home screen is displayed in step S708, each unit is requested to notify the operation processing unit 204 of the occurrence of the event. Specifically, the user information management unit 202 is requested to notify the operation processing unit 204 in a case where a state of the print job related to the logged-in user is changed. In addition, the job processing unit 203 is requested to notify the operation processing unit 204 in a case where a state of the image generation unit 131 regarding whether the image generation unit 131 can read a document is changed. The occurrence of the above-described event is detected only while the smart home screen is displayed, and a notification request is canceled in a case where the display is shifted to a different screen.

In a case where a notification is received from the user information management unit 202 or the job processing unit 203 after the notification of the occurrence of the event that causes a change in the arrangement order of the buttons is requested, the operation processing unit 204 executes the processing in the flowchart in FIG. 7 again to update the content of the smart home screen.

Figure 8B:
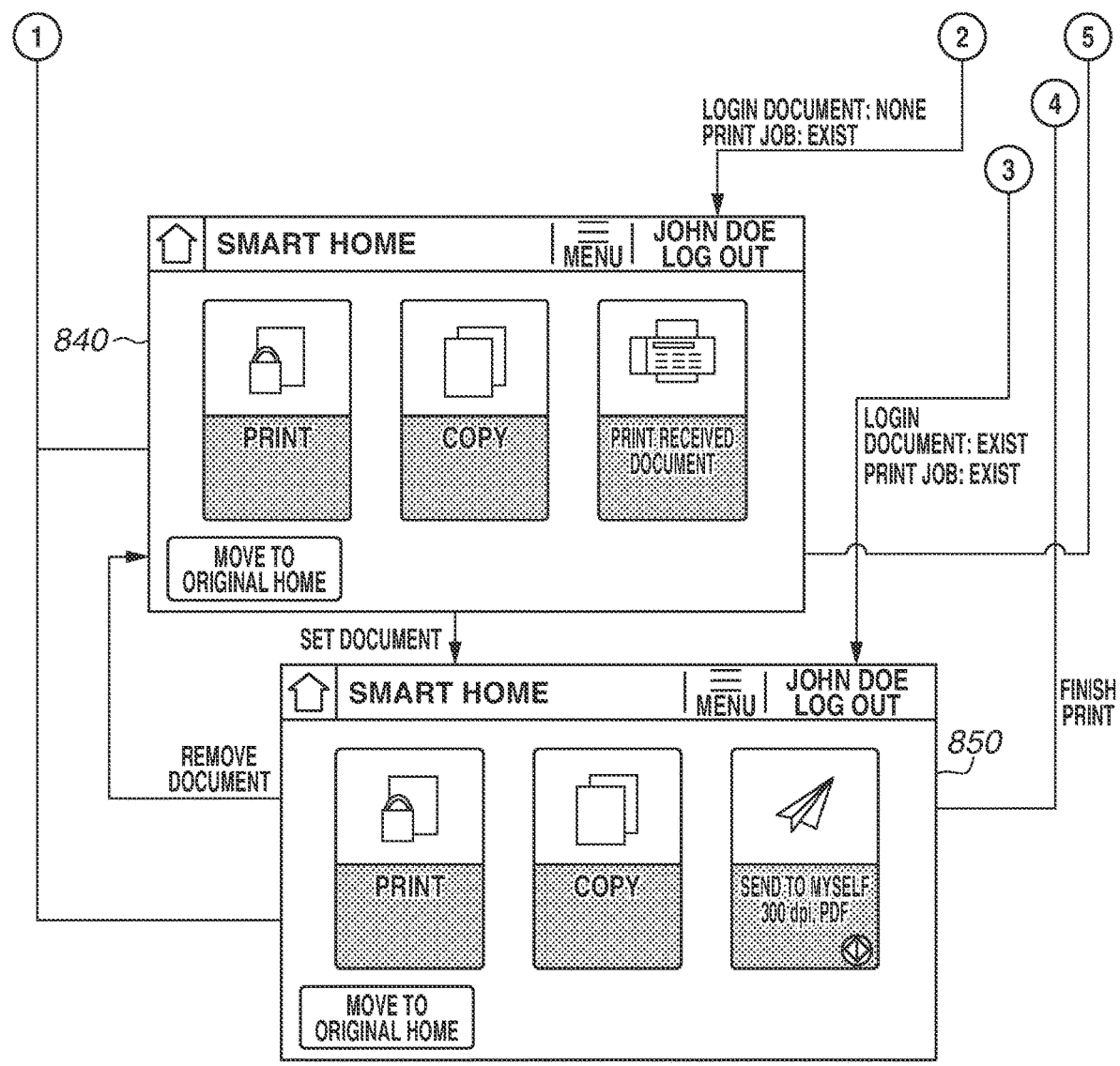
FIG. 8, composed of FIGS. SA and SB, is a drawing illustrating an example of a flow of screens regarding the smart home screen.

FIGS. 8A and 8B illustrate a transition of smart home screens according to the present exemplary embodiment. The transition between the screens is displayed on the display unit 120 in the image processing apparatus 1.

A login screen 810 is used for logging in to the image processing apparatus 1 and is similar to the screen described above in FIG. 4. After authentication is successful on the login screen 810, any one of the smart home screens described below is displayed depending on the state of the image processing apparatus 1 at the time of login.

Each of the smart home screens includes a logout button 821 for logging out in common. In a case where logout is performed, the screen transitions to the login screen 810. As described in the first exemplary embodiment, the content displayed on the smart home screen is changed depending on the state of the image processing apparatus 1 and a usage situation of a user.

Specifically, in a case where the image generation unit 131 does not detect a document and a print job of the logged-in user does not exist in the user information management unit 202 at the time of login, the screen transitions to a smart home screen 820. In a case where the image generation unit 131 detects a document and the print job of the logged-in user does not exist in the user information management unit 202 at the time of login, the screen transitions to a smart home screen 830. In a case where the image generation unit 131 does not detect a document and the print job of the logged-in user exists in the user information management unit 202 at the time of login, the screen transitions to a smart home screen 840. In a case where the image generation unit 131 detects a document and the print job of the logged-in user exists in the user information management unit 202 at the time of login, the screen transitions to a smart home screen 850.

In a case where the user places a document in a state in which the smart home screen 820 is displayed, and the image generation unit 131 detects the document, the screen transitions to the smart home screen 830.

In a case where the user removes a document from the scanner unit or the document is processed and thus disappears from the scanner unit in a state in which the smart home screen 830 is displayed, the image generation unit 131 ceases to detect the document, and the screen transitions to the smart home screen 820.

In a case where the image generation unit 131 detects a document in a state in which the smart home screen 840 is displayed, the screen transitions to the smart home screen 850. In a case where the user performs processing for executing the job and the print job of the logged-in user ceases to exist in the user information management unit 202 in the state in which the smart home screen 840 is displayed, the screen transitions to the smart home screen 820.

In a case where the image generation unit 131 ceases to detect a document in a state in which the smart home screen 850 is displayed, the screen transitions to the smart home screen 840. In a case where the print job of the logged-in user ceases to exist in the user information management unit 202 in the state in which the smart home screen 850 is displayed, the screen transitions to the smart home screen 830.

In a case of the second exemplary embodiment, regarding an order of applying the change rule of the button arrangement order, a rule regarding an event detected later may be applied later. For example, in a case where a user logs in to the image processing apparatus 1 and existence of a print job associated with the user is detected, and then, the user places a document on the scanner unit, the change rule of the button arrangement order regarding an event of "a print job associated with the logged-in user is accumulated" is applied, and then, the change rule of the button arrangement order regarding an event of "a document is placed on the scanner unit" is applied. In this case, the image processing apparatus 1 stores times at which the events are detected.

As described above, the operability of a user in using the image processing apparatus 1 can be improved by updating the content on the smart home screen based on the state of the image processing apparatus 1 and the operation performed by the user on the image processing apparatus 1 even after the smart home screen is displayed once.

Third Exemplary Embodiment

In the above-described exemplary embodiments, the state of the image generation unit 131 and presence or absence of the job related to the logged-in user are described as events that cause a change in the arrangement order of buttons. However, there is an event that causes a change in the arrangement order of buttons in addition to the above-described events. In a third exemplary embodiment, an example is described in which an arrangement order of buttons is changed based on a state of data received via the FAX unit 106.

In a case where a FAX document received via the FAX unit 106 is accumulated in the job processing unit 203, there is a possibility that the user performs processing on the FAX document. Thus, it is conceivable that a change rule of a button arrangement order is set so that a button for processing the FAX document, namely a button that is marked with "Yes" in the FAX reception related column C107, is placed at a higher rank in the arrangement order using an event that the FAX document is accumulated in the job processing unit 203 as a trigger. Table 5 illustrates a state of the button list obtained by applying the above-described change rule of the button arrangement order to Table 4 as an example. A button named "Print Received Document", which is marked with "Yes" in the FAX reception related column C107 is placed at a higher rank in the arrangement order of buttons.

TABLE 5

Button List After Executing Rule for Prioritizing Button for Printing Received FAX Document

| Identifier (C101) | Button Name (C102) | Displayable (C103) | Immediate Execution (C104) | Image Output Related (C105) | Image Generation Related (C106) | FAX Reception Related (C107) | Use Application (C108) |
|---|---|---|---|---|---|---|---|
| 002 | Print Received Document | Yes | Yes | Yes | No | Yes | Confidential Box |
| 006 | Print | Yes | No | Yes | No | No | Print |
| 001 | Copy | Yes | No | Yes | Yes | No | Copy |
| 003 | Send to Myself | Yes | Yes | No | Yes | No | Scan and Send |
| 004 | FAX | No | No | No | Yes | No | FAX |
| 005 | Scan and Send | Yes | No | No | Yes | No | Scan and Send |

Similarly, in a case where the image output unit 132 includes a manual feed tray as a component, and a sheet is placed in the manual feed tray, there is a possibility that the user outputs an image using the sheet. Thus, it is conceivable that the change rule of the button arrangement order is set so that a button for outputting an image, namely a button that is marked with "Yes" in the image output related column C105, is placed at a higher rank in the arrangement order using an event that the user places the sheet in the manual feed tray as a trigger. Table 6 illustrates a state of the button list obtained by applying the above-described change rule of the button arrangement order to Table 5 as an example. In this case, a button group that is marked with "Yes" in the image output related column C105 is already placed higher in the state in Table 5, and, as a result, the order in the button list is not changed.

TABLE 6

Button List After Executing Rule for Prioritizing Image Output Related Button

| Identifier (C101) | Button Name (C102) | Displayable (C103) | Immediate Execution (C104) | Image Output Related (C105) | Image Generation Related (C106) | FAX Reception Related (C107) | Use Application (C108) |
|---|---|---|---|---|---|---|---|
| 002 | Print Received Document | Yes | Yes | Yes | No | Yes | Confidential Box |
| 006 | Print | Yes | No | Yes | No | No | Print |
| 001 | Copy | Yes | No | Yes | Yes | No | Copy |
| 003 | Send to Myself | Yes | Yes | No | Yes | No | Scan and Send |
| 004 | FAX | No | No | No | Yes | No | FAX |
| 005 | Scan and Send | Yes | No | No | Yes | No | Scan and Send |

As described above, by setting a change rule of the button arrangement order to the image processing apparatus, it is possible to set which kind of event triggers what kind of change in the button arrangement order, whereby it is possible to flexibly improve operability of a user who uses the image processing apparatus.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2019-152247, filed Aug. 22, 2019, which is hereby incorporated by reference herein in its entirety.

What is claimed is:

1. An image processing apparatus including a menu screen comprising:
a memory; and
a processor in communication with the memory, wherein the processor performs:
displaying a plurality of buttons for executing processing on the menu screen;
detecting a state of the image processing apparatus;
changing, using one of states of the image processing apparatus as a target, an order of a button for executing processing related to the one of the states as the target to be higher in the menu screen; and
in a case where one state is detected in the detecting, controlling to execute the changing corresponding to the detected one state and, in a case where a plurality of states is detected in the detecting, controlling to repeatedly execute the changing using each of the detected plurality of states as the target one by one in sequence based on a condition.

2. The image processing apparatus according to claim 1, wherein the condition is an order specified in advance.

3. The image processing apparatus according to claim 1, wherein the condition is changeable.

4. The image processing apparatus according to claim 1, wherein the condition is determined based on an order of detecting the state of the image processing apparatus in the detecting.

5. The image processing apparatus according to claim 1, wherein the processor further performs authentication of a user of the image processing apparatus, and
wherein, in a case where the detecting is performed, whether a job associated with the authenticated user is accumulated in the image processing apparatus is detected as one of the states of the image processing apparatus.

6. The image processing apparatus according to claim 5, wherein the state of the image processing apparatus is a state in which a job associated with the authenticated user is accumulated in the image processing apparatus, and if the changing is performed in a case where the job associated with the authenticated user is accumulated in the image processing apparatus, an order of a button for executing processing with respect to the job is changed to be higher in the menu screen.

7. The image processing apparatus according to claim 5, wherein, based on a fact that the user is authenticated in the authentication, the processor further performs displaying the button, of which the rank in the arrangement order is changed in the controlling, on the menu screen.

8. The image processing apparatus according to claim 1, wherein the displayed buttons include a button that causes immediate execution of processing by being pressed.

9. The image processing apparatus according to claim 1, wherein the arrangement order of the buttons on the menu screen having a plurality of pages is changed in the changing.

10. The image processing apparatus according to claim 1, wherein the processor further changes the arrangement order of the buttons displayed on the menu screen each time the state of the image processing apparatus is detected in the detecting.

11. The image processing apparatus according to claim 1, wherein, based on the state of the image processing apparatus detected in the detecting, the processor further changes a display state of the button for executing processing related to the state.

12. The image processing apparatus according to claim 1, wherein the state of the image processing apparatus is a state in which a document is placed on a scanner unit in the image processing apparatus, and if the changing is performed in a case where the document is placed on the scanner unit, an order of a button for executing processing with respect to the document is changed to be higher in the menu screen.

13. The image processing apparatus according to claim 1, wherein the processor further performs storing the state in association with information indicating a function and an attribute of a button, and
wherein the button for executing processing related to the state is determined based on the stored information.

14. The image processing apparatus according to claim 1, wherein the processor further performs storing a button in association with information indicating a function and an attribute of the button, and
wherein the button for executing processing related to the state is determined based on the stored information.

15. The image processing apparatus according to claim 1, wherein the processor further performs switching between a menu screen on which the arrangement order of buttons is changed in the changing and a menu screen on which the arrangement order of buttons is not changed in the changing.

16. The image processing apparatus according to claim 1, wherein the state of the image processing apparatus is a state in which the image processing apparatus has received a facsimile (FAX) document, and if the changing is performed in a case where the image processing apparatus has received the FAX document, a rank of a button for executing processing with respect to the FAX document is changed to be high in the arrangement order of buttons on the menu screen.

17. The image processing apparatus according to claim 1, wherein the state of the image processing apparatus is a state in which a sheet is placed on a manual feed tray included in the image processing apparatus, and if the changing is performed in a case where the sheet is placed on the manual feed tray, a rank of a button for executing processing with respect to the sheet is changed to be high in the arrangement order of buttons on the menu screen.

18. A method for controlling an image processing apparatus including a menu screen, the method comprising:
displaying a plurality of buttons for executing processing on the menu screen;
detecting a state of the image processing apparatus;
changing, using one of states of the image processing apparatus as a target, an order of a button for executing processing related to the one of the states as the target to be higher in the menu screen; and
in a case where one state is detected in the detecting, controlling to execute the changing corresponding to the detected one state and, in a case where a plurality of states is detected in the detecting, controlling to repeatedly execute the changing using each of the detected plurality of states as the target one by one in sequence based on a condition.

19. A non-transitory computer-readable storage medium storing a program to cause a computer to perform a method for controlling an image processing apparatus including a menu screen, the method comprising:
displaying a plurality of buttons for executing processing on the menu screen;

detecting a state of the image processing apparatus;
changing, using one of states of the image processing apparatus as a target, an order of a button for executing processing related to the one of the states as the target to be higher in the menu screen; and
in a case where one state is detected in the detecting, controlling to execute the changing corresponding to the detected one state and, in a case where a plurality of states is detected in the detecting, controlling to repeatedly execute the changing using each of the detected plurality of states as the target one by one in sequence based on a condition.

* * * * *